United States Patent
Shi et al.

(10) Patent No.: US 9,635,338 B2
(45) Date of Patent: Apr. 25, 2017

(54) METHOD FOR ENCODING AND DECODING INTEGRAL IMAGES, DEVICE FOR ENCODING AND DECODING INTEGRAL IMAGES AND CORRESPONDING COMPUTER PROGRAMS

(75) Inventors: Shasha Shi, Cesson Sevigne (FR); Patrick Gioia, Servon-sur-Vilaine (FR)

(73) Assignee: ORANGE, Paris (FR)

( * ) Notice: Subject to any disclaimer, the term of this patent is extended or adjusted under 35 U.S.C. 154(b) by 573 days.

(21) Appl. No.: 14/115,749

(22) PCT Filed: Apr. 26, 2012

(86) PCT No.: PCT/FR2012/050934
§ 371 (c)(1),
(2), (4) Date: Nov. 5, 2013

(87) PCT Pub. No.: WO2012/150407
PCT Pub. Date: Nov. 8, 2012

(65) Prior Publication Data
US 2014/0085417 A1 Mar. 27, 2014

(30) Foreign Application Priority Data
May 5, 2011 (FR) ...................................... 11 53852

(51) Int. Cl.
*H04N 13/00* (2006.01)
*H04N 19/597* (2014.01)
(Continued)

(52) U.S. Cl.
CPC ....... *H04N 13/0011* (2013.01); *H04N 19/139* (2014.11); *H04N 19/172* (2014.11);
(Continued)

(58) Field of Classification Search
CPC ........... H04N 13/0043; H04N 13/0232; H04N 19/597
(Continued)

(56) References Cited

U.S. PATENT DOCUMENTS

| | | | | |
|---|---|---|---|---|
| 2009/0153652 A1* | 6/2009 | Barenbrug | ......... | H04N 13/0018 348/54 |
| 2010/0238313 A1* | 9/2010 | Ohki | ......... | G06T 3/40 348/222.1 |
| 2011/0280300 A1* | 11/2011 | Tourapis | ......... | H04N 13/0048 375/240.2 |

FOREIGN PATENT DOCUMENTS

EP 2306742 A2 4/2011

OTHER PUBLICATIONS

R. Zaharia et al., "Adaptive 3D-DCT compression algorithm for continuous parallax 3D integral imaging", Signal Processing: Image Communication 17 (2002) 231-242.
(Continued)

*Primary Examiner* — Tat Chio
*Assistant Examiner* — Nguyen Truong
(74) *Attorney, Agent, or Firm* — David D. Brush; Westman Champlin & Koehler, P.A.

(57) ABSTRACT

An encoder and method of encoding are provided for encoding at least one integral image representing at least one object in perspective in a scene and including a plurality of elemental images. The method of encoding includes generating a plurality of K sub-images on the basis of the plurality of basic images; arrangement of the sub-images in a predetermined pattern such as to form a multi-view image of the object, the views corresponding respectively to the sub-images; and adaptive compression of the multi-view image formed, as a function of the motion type of the object in the scene.

13 Claims, 7 Drawing Sheets

Figure 1:
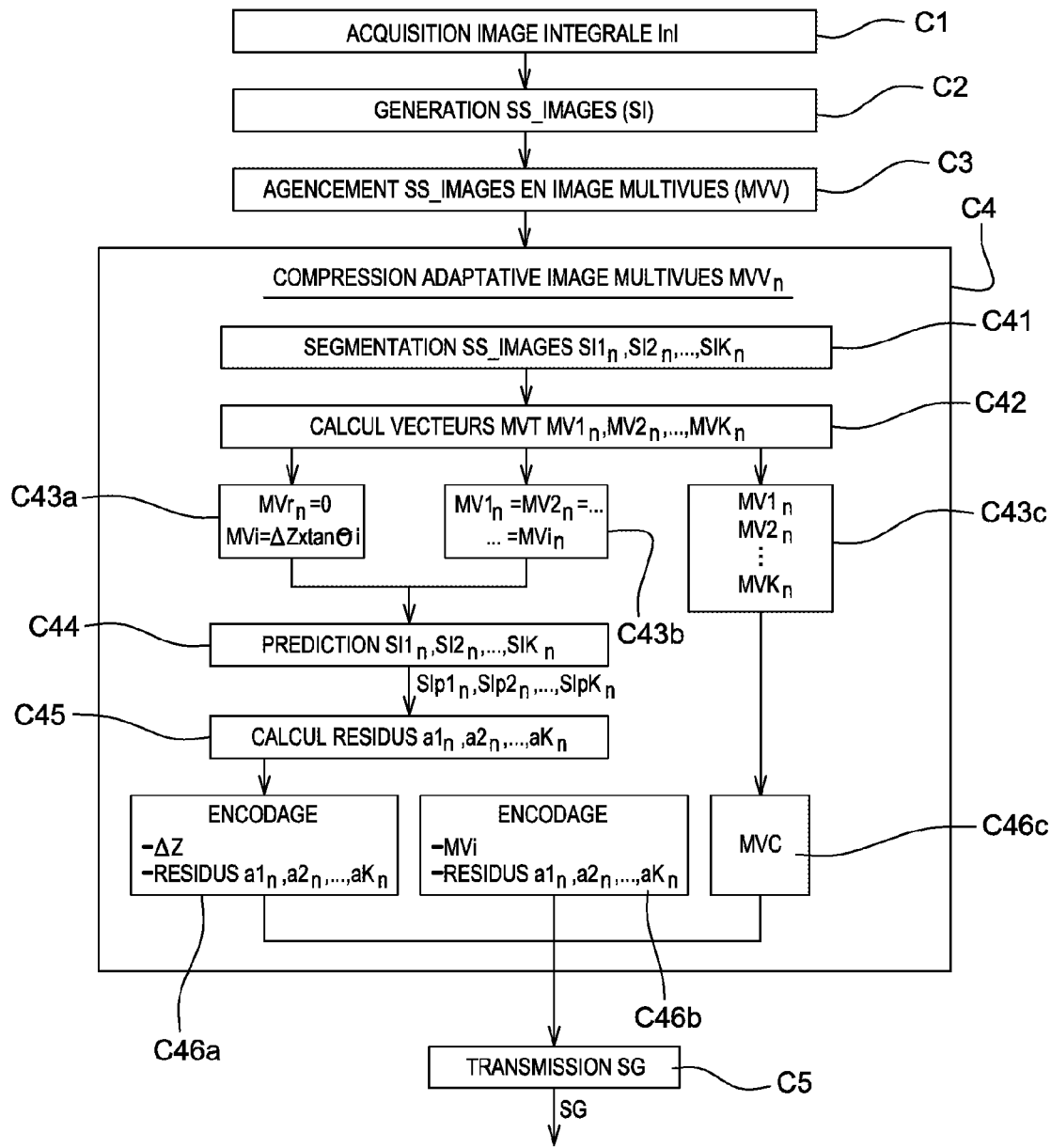

(51) Int. Cl.
*H04N 19/139* (2014.01)
*H04N 19/172* (2014.01)
*H04N 19/46* (2014.01)
*H04N 19/61* (2014.01)
*H04N 13/02* (2006.01)

(52) U.S. Cl.
CPC ........... *H04N 19/46* (2014.11); *H04N 19/597* (2014.11); *H04N 19/61* (2014.11); *H04N 13/0048* (2013.01); *H04N 13/0232* (2013.01)

(58) Field of Classification Search
USPC .......................................................... 348/43
See application file for complete search history.

(56) References Cited

OTHER PUBLICATIONS

International Search Report and Written Opinion dated Jun. 25, 2012 for corresponding International Application No. PCT/FR20121/050934, filed Apr. 26, 2012.
Kang H. H. et al., "Efficient Compression of Motion-Compensated Sub-Images with KarhunenLoeve Transform in Three-Dimensional Integral Imaging", Optics Communications, North-Hollans Publishing Co. Amsterdam, NL, vol. 283, No. 6, Mar. 15, 2010 (Mar. 15, 2010), pp. 920-928, XP026868630.
Dick J. et al., "3D Holoscopic Video Coding Using MVC" EUROCON—International Conference on Computer as a Tool (EUROCON), 2011 IEEE, Apr. 27, 2011 (Apr. 27, 2011), pp. 1-4, XP002653889.
Olsson R., "Synthesis, Coding, and Evaluation of 3D Images Based on Integral Imaging", MID Sweden University Doctoral Thesis, Mittuniversitetet, Sundsvall, Sweden, no. Doctoral Thesis No. 55, Jan. 1, 2008 (Jan. 1, 2008), pp. I-XXI, 1, XP001562238.
Olsson R. et al., "Evaluation of a Combined Pre-Processing and H.264-Compression Scheme for 3D Integral Images", Visual Communications and Image Processing; Jan. 30, 2007-Jan. 2, 2007; San Jose, Jan. 30, 2007 (Jan. 30, 2007), XP030081158.
Anthony Verto et al., "Towards a 3D Video Format for Auto-Stereoscopic Displays", Applications of Digital Image Processing XXXI : Aug. 11-14, 2008, San Diego, California, USA; [Proceedings of SPIE ; 7073], SPIE, Bellingham, Wash, vol. 7073, No. TR2008-057, Aug. 11, 2008 (Aug. 11, 2008), pp. 1-12, XP002603277.
Ying Chen et al., "The Emerging MVC Standard for 3D Video Services", Eurasip Journal on Advances in Signal Processing, vol. 2009, Mar. 5, 2008 (Mar. 5, 2008), pp. 786015-1, XP002634721.
English translation of the Written Opinion dated Jun. 25, 2012 for corresponding International Application No. PCT/FR2012/050934, filed Apr. 26, 2012.

\* cited by examiner

METHOD FOR ENCODING AND DECODING INTEGRAL IMAGES, DEVICE FOR ENCODING AND DECODING INTEGRAL IMAGES AND CORRESPONDING COMPUTER PROGRAMS

CROSS-REFERENCE TO RELATED APPLICATIONS

This Application is a Section 371 National Stage Application of International Application No. PCT/FR2012/050934, filed Apr. 26, 2012, which is incorporated by reference in its entirety and published as WO 2012/150407 on Nov. 8, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present invention relates generally to the domain of image processing, and more specifically to encoding and decoding integral images and sequences of integral images.

The invention can in particular, but not exclusively, be applied to the video encoding used in existing video encoders and the amendments thereof (MPEG, H.264, H.264 SVC, H.264 MVC, etc.) or future video encoders (ITU-T/VCEG (H.265) or ISO/MPEG (HEVC)), and to the corresponding decoding.

BACKGROUND OF THE DISCLOSURE

Integral imaging is a technique for displaying images in relief. It is considered to be particularly promising in the development of 3D television, in particular because it offers a total parallax, as opposed to a stereoscopic image display.

An integral image conventionally comprises a large number of basic images that represent the different angles of a scene in three dimensions. The compression of an integral image therefore amounts to compressing all of the elemental images.

A known method for compressing integral images involves using the MPEG-4 AVC video format to encode each of the elemental images of an integral image. Such a method is relatively direct, because it simply involves processing the integral images as a traditional video sequence.

A drawback of such a method lies in the fact that the spatial and temporal redundancy is reduced indiscriminately. The specific form of integral images, according to which elemental images are likely to present numerous spatial and temporal redundancies between one another, is therefore not exploited optimally.

A more efficient method for compressing integral images without moving outside the MPEG-4 AVC standard involves reorganizing the elemental images. This enables the redundancies between elemental images to be exploited, but lots of redundant information remains unexploited, in particular the significant correlation between the elemental images of a current integral image and the corresponding elemental images of adjacent integral images.

Another known method involves encoding integral images using a 3D-DCT compression algorithm, as described in the document R. Zaharia, A. Aggoun, M. McCormick, 'Adaptive 3D-DCT compression algorithm for continuous parallax 3D integral imaging', Signal Processing: Image Communication 17 (2002) 231-242. This method is relatively close to the aforementioned methods based on the MPEG-4 AVC standard. Indeed, the reorganization of the elemental images is identical. The difference between this other known method and the aforementioned methods lies in the encoding structure of image sequences. This method undoubtedly improves the compression of integral images, but does not enable the redundancies characteristic of integral images to be reduced.

SUMMARY

According to a first aspect, the present invention relates to a method for encoding at least one integral image representing at least one object in perspective in a scene and comprising a plurality of elemental images, such a method implementing a step in which a plurality of K sub-images is generated from the plurality of elemental images.

The encoding method according to the invention is noteworthy in that it implements the following steps:
  arrangement of the sub-images in a predetermined pattern such as to form a multi-view image of the object, the views corresponding respectively to the sub-images;
  adaptive compression of the multi-view image formed, as a function of the motion type of the object in the scene.

On account of the reorganization of the sub-images thus arranged in relation to one another according to a predetermined pattern, such an arrangement makes it possible to optimally exploit the multiple spatial and temporal redundancies between the elemental images of an integral image. This makes the encoding of integral images more efficient.

Such a reorganization of the sub-images combined with adaptive compression of these sub-images also obviates the need to include redundant, and therefore unnecessary, encoding information in the signal to be transmitted. This generates a significant reduction in signaling costs.

According to a specific embodiment, the adaptive compression step implements the following sub-steps for a current multi-view image:
  prediction of each of the K current sub-images of the current multi-view image as a function respectively of K reference sub-images of a reference multi-view image previously encoded then decoded, delivering predicted K sub-images,
  determination of residual data by comparing data relating to each of the K current sub-images and respectively to each of the predicted K sub-images,
  calculation of K motion vectors describing the motion between the K current sub-images and respectively the K reference sub-images,
  calculation of the depth that the object has moved in the scene, if the motion vector calculated in relation to the current sub-image that is located at the center of the current multi-view image has a value of zero, the encoding method according to the invention also implementing:
  the transmission of a data signal comprising at least the residual data determined and the depth value calculated, if the motion vector calculated in relation to the current sub-image that is located at the center of the current multi-view image has a value of zero, the transmission of a data signal comprising at least the residual data determined and the value of one of the K motion vectors calculated, if the K motion vectors calculated have the same value, the transmission of a data signal comprising at least the residual data determined and the respective values of the K motion vectors calculated, if at least two of the K motion vectors calculated have different values.

Such an arrangement makes it possible to significantly reduce encoding cost, in particular in the following two cases:

if the object is moving in the scene exclusively in a horizontal direction, if the object is moving in the scene exclusively in a vertical direction.

According to another specific embodiment, MVC encoding is used, if at least two of the K motion vectors calculated have different values.

Such an arrangement makes it possible to efficiently encode integral images, taking advantage of the spatial and temporal redundancies thereof by subjecting them to the standard MVC (English abbreviation of "multi-view coding") encoding technique used until now for encoding multi-view images.

In order to encode such integral images even more efficiently, the invention proposes a variant comprising a modified MVC coding structure.

Accordingly, the present invention relates to a device for encoding at least one integral image representing at least one object in perspective in a scene and comprising a plurality of elemental images, such a device comprising means for generating a plurality of K sub-images from the plurality of elemental images.

Such an encoding device is noteworthy in that it comprises:

means for arranging the sub-images in a predetermined pattern such as to form a multi-view image of the object, the views of the multi-view image corresponding respectively to the sub-images;

means for adaptively compressing the multi-view image formed as a function of the motion type of the object in the scene.

According to a specific embodiment, the adaptive compression means include, for a current multi-view image:

sub-means for predicting each of the K current sub-images of the current multi-view image as a function respectively of K reference sub-images of a reference multi-view image previously encoded then decoded, delivering K predicted sub-images, sub-means for determining residual data by comparing data relating to each of the K current sub-images and respectively to each of the K predicted sub-images, sub-means for calculating K motion vectors describing the motion between the K current sub-images and respectively the K reference sub-images, sub-means for transmitting a data signal comprising at least the residual data determined, the transmission sub-means also sending:

either a previously calculated value of the depth that the object has moved in the scene, if the motion vector calculated in relation to the current sub-image that is located at the center of the current multi-view image has a value of zero, or a value of one of the K motion vectors calculated, or the respective values of the K motion vectors calculated, if at least two of the K motion vectors calculated have different values.

According to another specific embodiment, MVC encoding is used if at least two of the K motion vectors calculated have different values.

According to a second aspect, the invention relates to a method for decoding a data signal representing at least one integral image that has been previously encoded, said integral image representing at least one object in perspective in a scene and comprising a plurality of elemental images.

This method according to the invention is noteworthy in that it implements the following steps:

adaptive decompression of a current multi-view image previously encoded, as a function of the type of motion of the object in the scene, as contained in the data signal, arrangement according to a given pattern of a plurality of K current sub-images of the current multi-view image, such as to reconstruct the multi-view image of the object, the views of the multi-view image corresponding respectively to the sub-images, generation of the plurality of elemental images from the arrangement of K sub-images, such as to reconstruct the integral image.

According to a specific embodiment, the adaptive decompression step implements the following sub-steps for a current integral image to be reconstructed:

decoding of residual data relating to the plurality of K sub-images of the previously encoded multi-view image, the residual data being contained in the data signal, if the data signal contains a value of the depth that the object has moved in the scene;

calculation of a motion vector corresponding to the motion, prediction, using the residual data decoded and the motion vector calculated, of each of the K current sub-images of the current multi-view image as a function respectively of K reference sub-images of a reference multi-view image previously decoded, delivering K predicted sub-images, if the data signal contains a single motion vector value calculated during encoding, said vector describing the motion between one of the K sub-images to be reconstructed and one of the K reference sub-images previously decoded, prediction, using the residual data decoded and the motion vector calculated, of each of the K current sub-images of the current multi-view image as a function respectively of K reference sub-images of a reference multi-view image previously decoded, delivering K predicted sub-images, if the data signal contains K motion vector values calculated during encoding, the K motion vectors describing the motion between K sub-images to be reconstructed and respectively K reference sub-images previously decoded, prediction, using the residual data decoded and the K motion vector values, of each of the K current sub-images of the current multi-view image as a function respectively of K reference sub-images of a reference multi-view image previously decoded, delivering K predicted sub-images.

According to another specific embodiment, if the data signal contains K motion vector values, MVC decoding is used.

Accordingly, the invention relates to a device for decoding a data signal representing at least one integral image that has been previously encoded, said integral image representing at least one object in perspective in a scene and comprising a plurality of elemental images.

Such a device is noteworthy in that it comprises:
- means for adaptively decompressing a current multi-view image previously encoded, as a function of the type of motion of the object in the scene, as contained in said signal,
- means for arranging, according to a given pattern, a plurality of K current sub-images of the current multi-view image, to reconstruct the multi-view image of the object, the views of the multi-view image corresponding respectively to the sub-images,
- means for generating the plurality of elemental images from the arrangement of K sub-images, to reconstruct the integral image.

According to a specific embodiment, the adaptive decompression means include:
- sub-means for decoding residual data relating to the plurality of K sub-images previously encoded, the residual data being contained in the data signal,
- sub-means for predicting, using the decoded residual data, each of the K current sub-images of the current multi-view image as a function respectively of K reference sub-images of a reference multi-view image previously decoded, delivering K predicted sub-images, the prediction sub-means also using the following for prediction purposes:
  - either the value of a motion vector calculated on the basis of a value of the depth that the object has moved in the scene, if such a value is contained in the data signal,
  - or a single motion vector value calculated during encoding, such a vector describing the motion between one of the K sub-images to be reconstructed and one of the K reference sub-images previously decoded, if such a value is contained in the data signal,
  - or K motion vector values calculated during encoding, the K motion vectors describing the motion between K sub-images to be reconstructed and respectively K reference sub-images previously decoded, if such K values are contained in the data signal.

According to another specific embodiment, MVC decoding is used if the data signal contains K motion vector values.

According to a third aspect, the invention relates to a computer program containing instructions for implementing one of the methods according to the invention, when run on a computer.

The invention also relates to a computer program on a data medium, this program containing the instructions for implementing one of the methods according to the invention, as described above.

This program can use any programming language, and may be source code, object code, or intermediate code between source code and object code, such as in a partially compiled form, or in any other form required.

The invention also relates to a computer-readable data medium containing the instructions for a computer program, as mentioned above.

The data medium can be any unit or device able to store the program. For example, the medium may be a storage medium, such as a ROM, for example a CD ROM or a microelectronic circuit ROM, or a magnetic storage medium, for example a floppy disk or a hard disk.

Moreover, the data medium may be a transmittable medium such as an electric or optical signal, that can be routed via an electrical or optical cable, by radio or using other means. The program according to the invention may in particular be downloaded from an Internet network.

Alternatively, the data medium may be an integrated circuit incorporating the program, the circuit being designed to run or to be used in the running of the present method.

The decoding method, the encoding device, the decoding device and the computer programs mentioned above provide at least the same benefits as provided by the encoding method according to the present invention.

SHORT DESCRIPTION OF THE DRAWINGS

Figure 2:
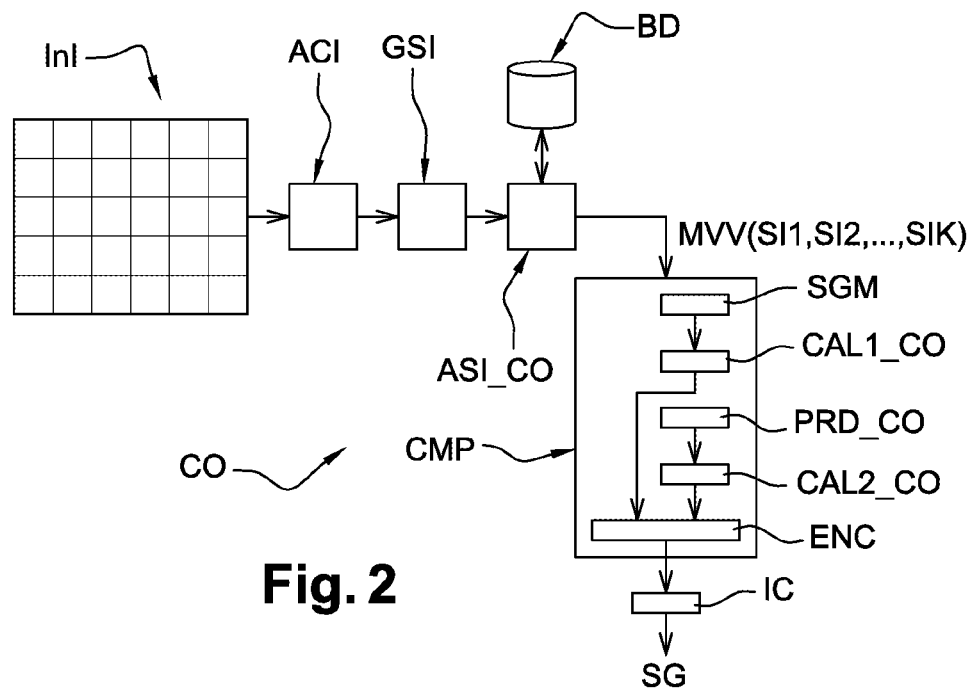
Figure 4:
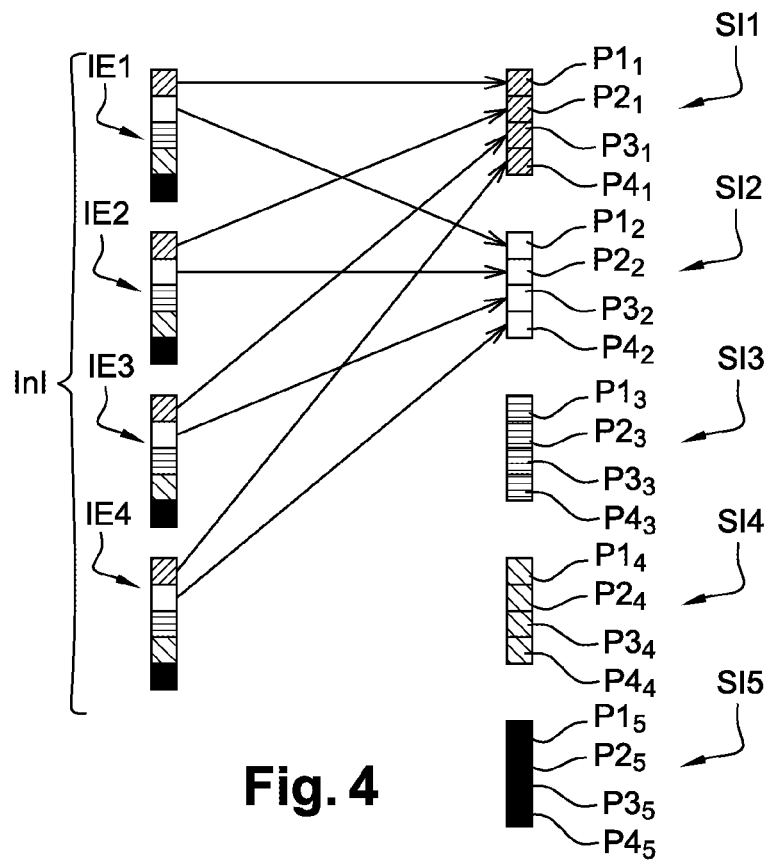
Figure 3A:
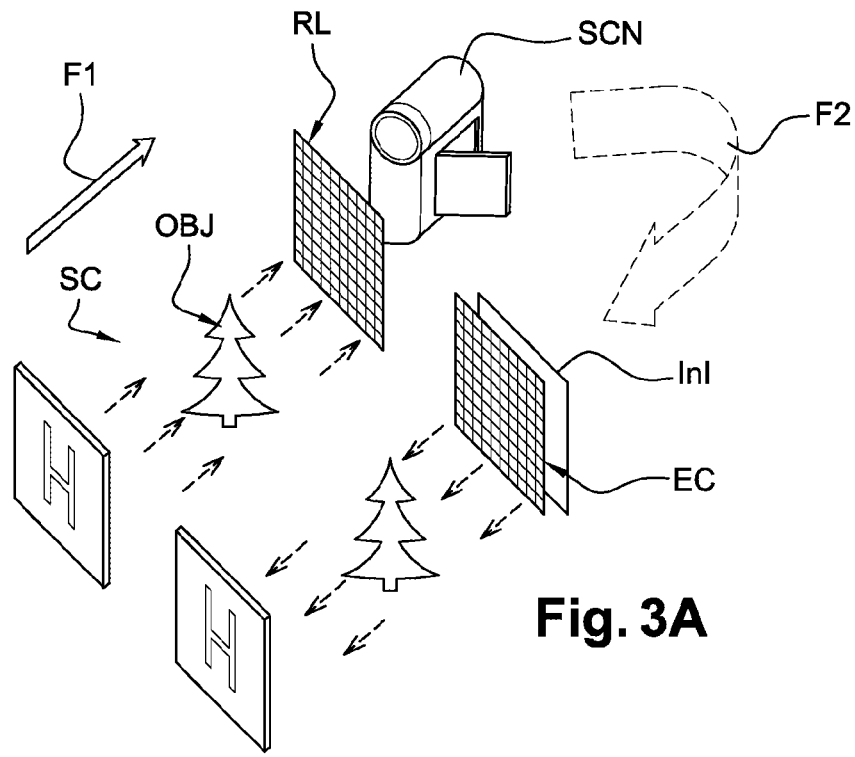
Figure 3B:
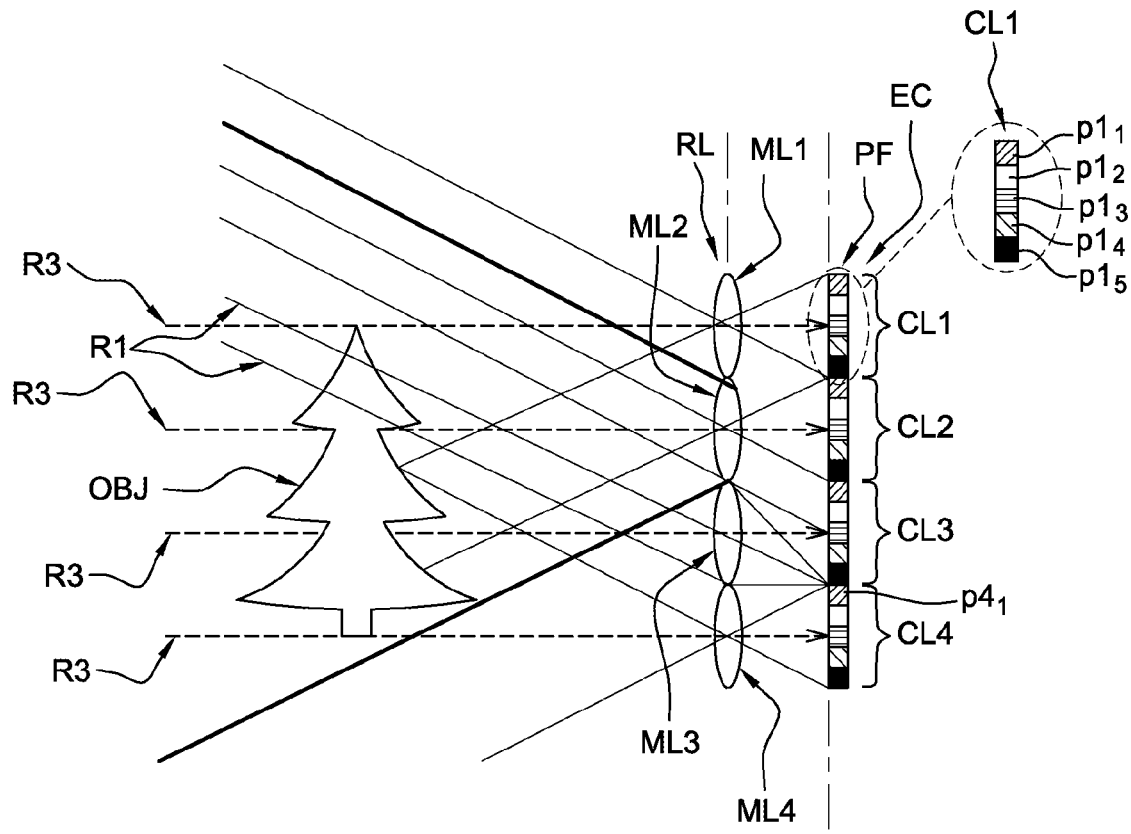
Figure 5A:
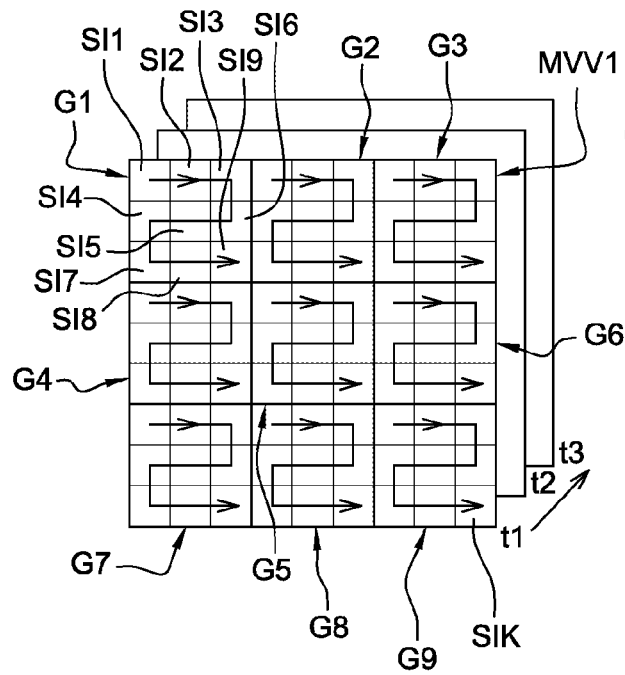
Figure 5B:
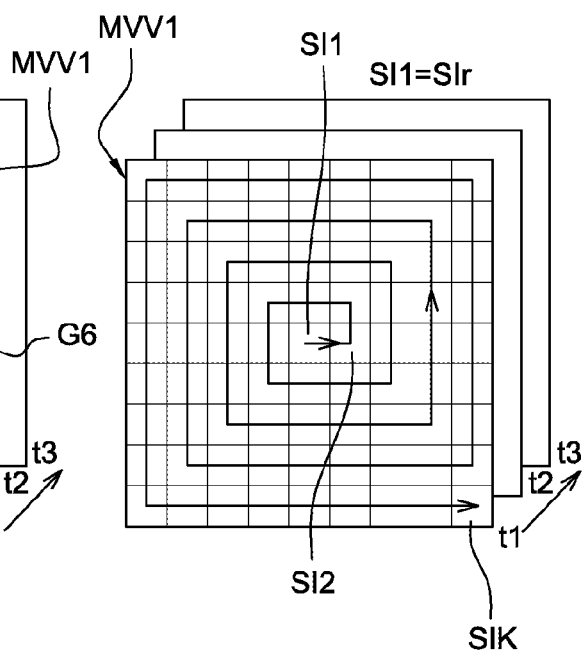
Figure 5C:
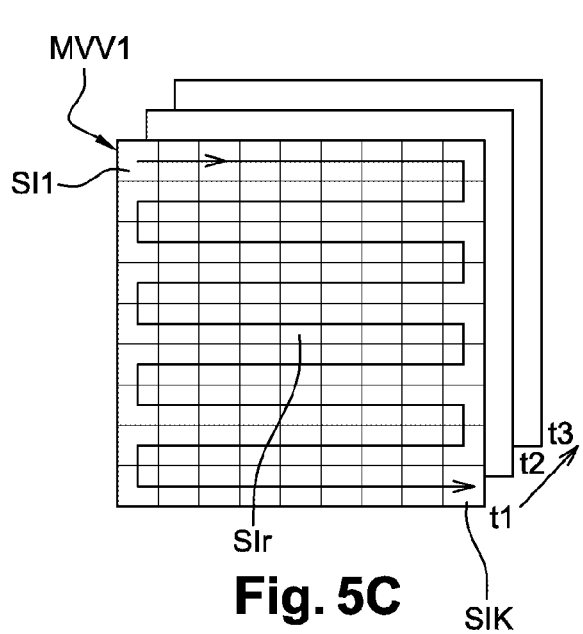
Figure 5D:
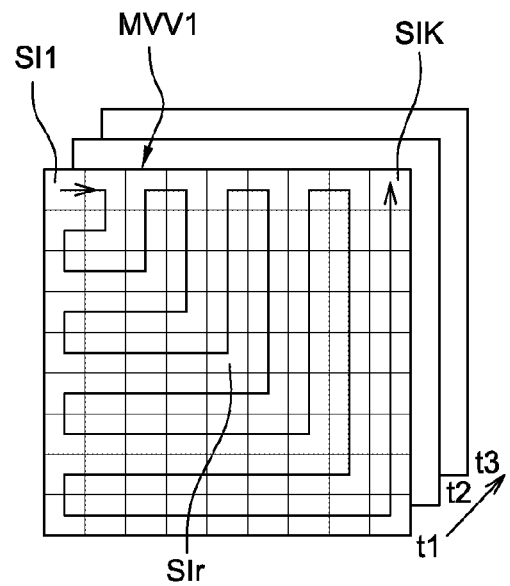
Figure 6A:
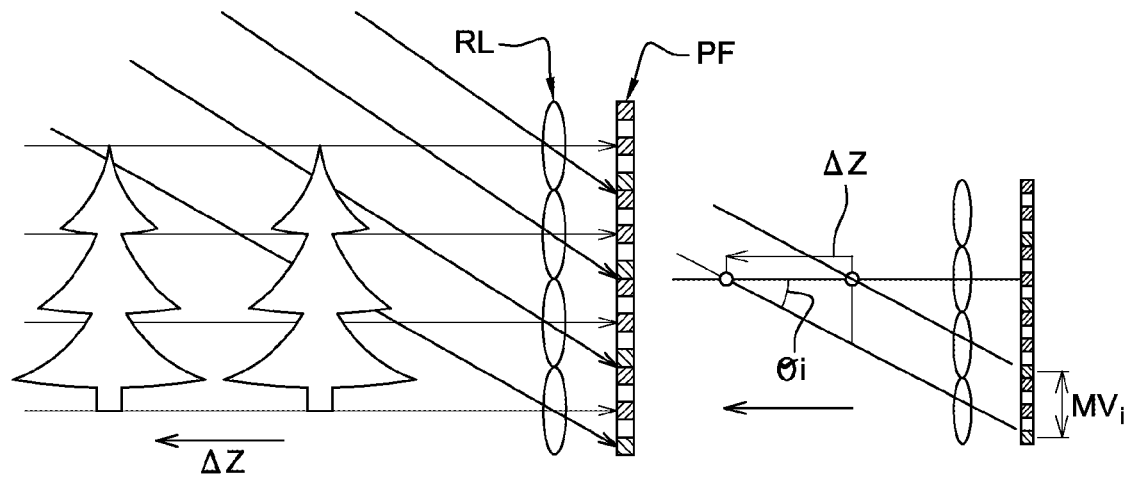
Figure 6B:
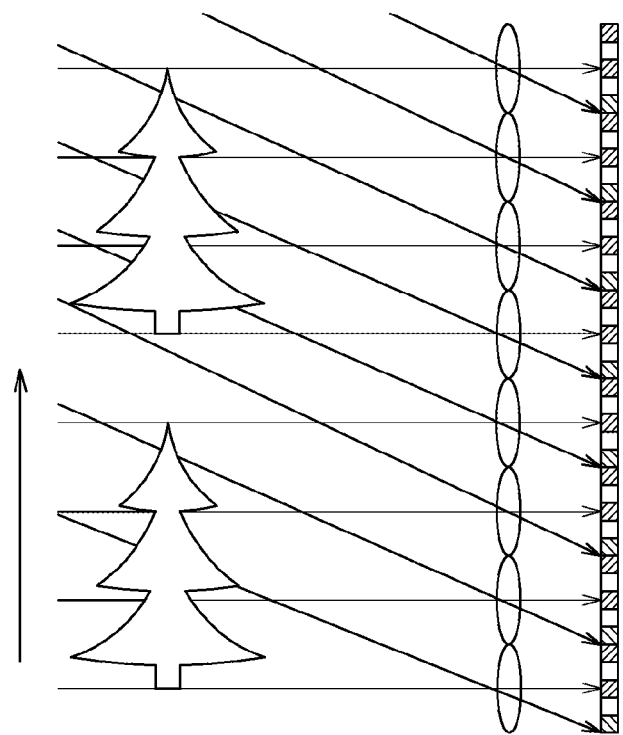
Figure 7A:
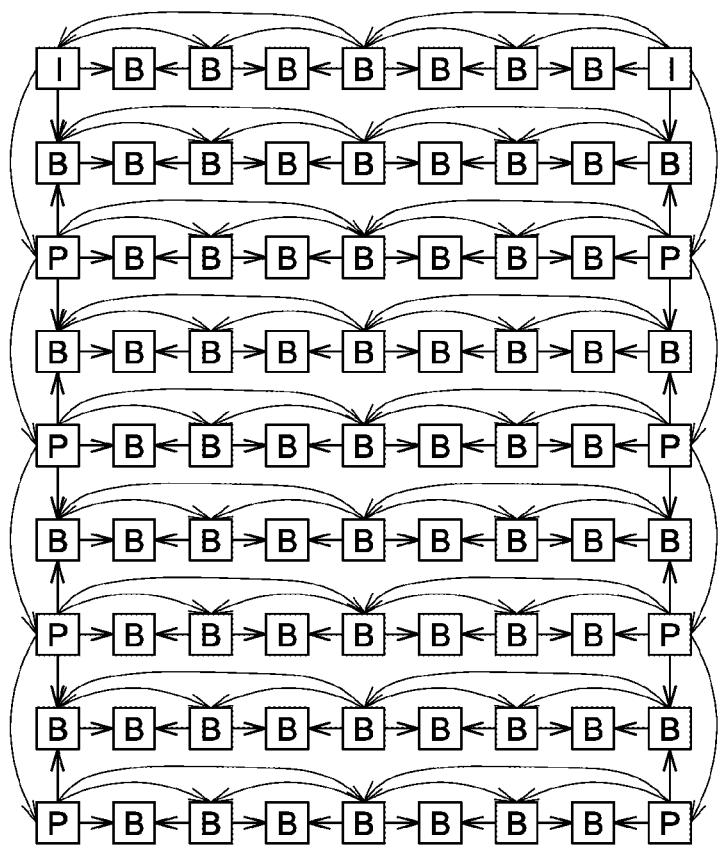
Figure 7B:
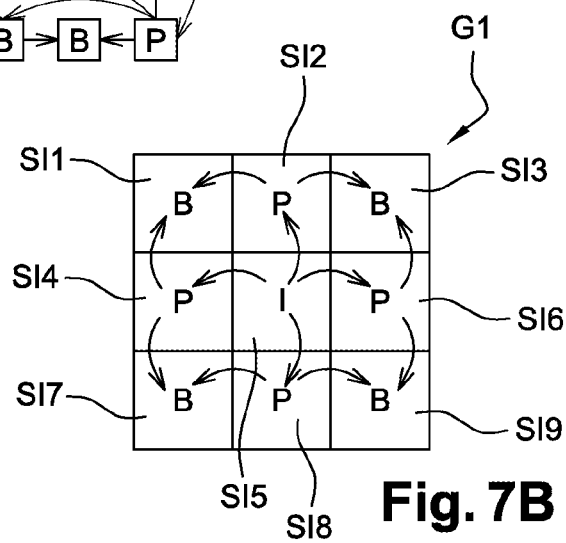
Figure 8:
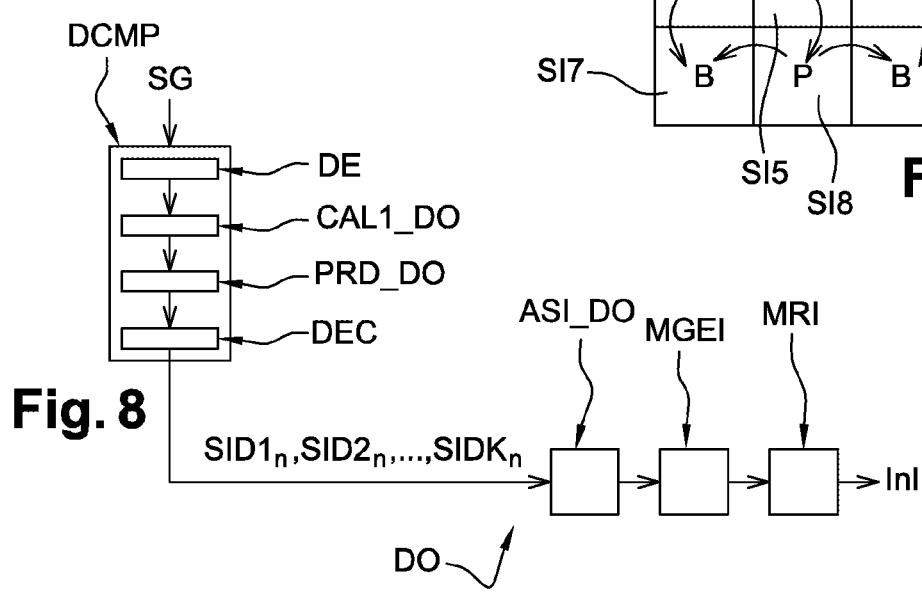
Figure 9:
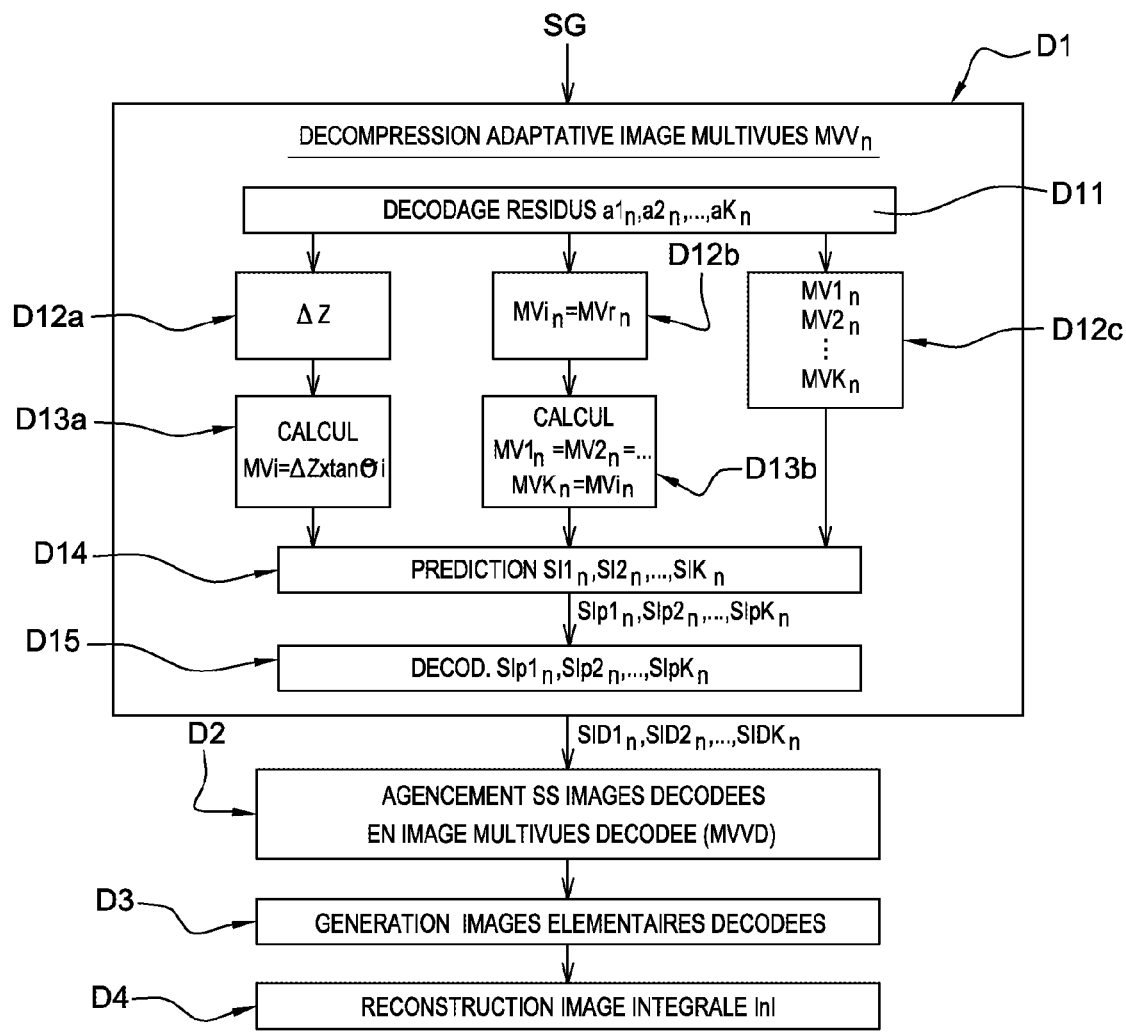

Other features and advantages are set out in the preferred embodiments described with reference to the figures, in which:

FIG. 1 shows the steps of the encoding method according to the invention,

FIG. 2 shows an embodiment of an encoding device according to the invention, FIGS. 3A and 3B show an integral-image acquisition step of the encoding method according to the invention, FIG. 4 shows a step in which sub-images are generated from the integral image acquired, as shown in FIG. 3A, FIGS. 5A to 5D show different possible patterns for arranging the sub-images making up a multi-view image, FIGS. 6A and 6B show respectively two specific instances of motion of an object in a scene, FIGS. 7A and 7B show respectively a first type of MVC encoding structure applied to the multi-view images in FIGS. 5B to 5D and a second type of MVC encoding structure applied to the multi-view image shown in FIG. 5A, FIG. 8 shows a decoding device according to the invention, FIG. 9 shows the steps of the decoding method according to the invention.

DETAILED DESCRIPTION OF AN EMBODIMENT

An embodiment of the invention, in which the encoding method according to the invention is used to encode a sequence of integral images, is described below.

The encoding method according to the invention is shown in the form of an algorithm comprising steps C1 to C5, as shown in FIG. 1.

According to the embodiment of the invention, the encoding method according to the invention is implemented in an encoding device CO shown in FIG. 2.

The first step C1, shown in FIG. 1, is the acquisition of an integral image InI from the sequence of images to be encoded by an image acquisition module ACI shown in FIG. 2.

An example of integral-image acquisition is shown in FIGS. 3A and 3B.

In the example shown, the integral image InI represents an object OBJ in perspective in a scene SC in three dimensions. The integral image InI is acquired in the direction of the arrow F1 by a CCD (English abbreviation for "Charged-Coupled Device") 2D scanner that is indicated with reference sign SCN in FIG. 3A, then reconstructed on a screen EC, in the direction of the arrow F2. Such an acquisition is affected using a lenticular screen RL placed between the object OBJ and the scanner SCN.

In the example shown in FIG. 3B, the lenticular screen RL includes four identical microlenses ML1, ML2, ML3 and ML4. A screen EC is placed in the focal plane of the aforementioned microlenses, such a screen being able to reproduce the integral image InI for an observer. In a known manner, the screen EC includes a pixel matrix that includes several identical cells each comprising a plurality of differently colored pixels. Each cell is the same size as a microlens. In the example shown in FIG. 3B, the screen EC includes four pixel cells CL1, CL2, CL3 and CL4 arranged respectively to correspond to the four microlenses ML1, ML2, ML3 and ML4. Each cell is made up for example of five differently colored pixels. For a given cell CLj (1≤j≤4), said cell contains five pixels $Pj_1$, $Pj_2$, $Pj_3$, $Pj_4$, $Pj_5$. For illustration purposes, FIG. 3B shows an enlarged view of the composition of a cell CL1 made up of five pixels $P1_1$, $P1_2$, $P1_3$, $P1_4$, $P1_5$.

During acquisition, light rays from the object OBJ pass through each microlens ML1, ML2, ML3 and ML4, then hit the pixels of each cell CL1, CL2, CL3 and CL4, in the focal plane PF of said microlenses. In consideration of the specific arrangement of the lenticular screen RL and of the pixel matrix forming the screen EC, the light rays:

hit pixel $P1_1$ of cell CL1, pixel $P2_1$ of cell CL2, pixel $P3_1$ of cell CL3 and pixel $P4_1$ of cell CL4 at a first angle of incidence, hit pixel $P1_2$ of cell CL1, pixel $P2_2$ of cell CL2, pixel $P3_2$ of cell CL3 and pixel $P4_2$ of cell CL4 at a second angle of incidence, hit pixel $P1_3$ of cell CL1, pixel $P2_3$ of cell CL2, pixel $P3_3$ of cell CL3 and pixel $P4_3$ of cell CL4 at a third angle of incidence, hit pixel $P1_4$ of cell CL1, pixel $P2_4$ of cell CL2, pixel $P3_4$ of cell CL3 and pixel $P4_4$ of cell CL4 at a fourth angle of incidence, hit pixel $P1_5$ of cell CL1, pixel $P2_5$ of cell CL2, pixel $P3_5$ of cell CL3 and pixel $P4_5$ of cell CL4 at a fifth angle of incidence.

In a known manner, each angle of incidence corresponds to a specific viewing angle at which an observer can see the object OBJ in perspective. The values of these angles are limited by the value of the viewing angle of a microlens ML1, ML2, ML3, ML4. Such a viewing angle, corresponding to the viewing angle of the microlens ML2, is shown using a full bold line in FIG. 3B for illustration purposes.

For the sake of clarity in FIG. 3B, only two light rays of differing incidence are shown. In the example shown in FIG. 3B:

the light rays R1 hit pixel $P4_1$ of cell CL4 at a specific angle that corresponds to a particular viewing angle at which an observer can view the object OBJ at a particular angle corresponding to said viewing angle, the light rays R3 hit pixel $P1_3$ of cell CL1, pixel $P2_3$ of cell CL2, pixel $P3_3$ of cell CL3 and pixel $P4_3$ of cell CL4 respectively at a zero angle of incidence.

In the example shown, following the acquisition step C1, four images of the object OBJ from four different angles are recorded since there are four microlenses. In a known manner, these four images constitute the elemental images of the integral image InI.

During a step C2 shown in FIG. 1, in a known manner, a plurality of K sub-images SI1, SI2, . . . , SIK is generated, following the acquisition step C1, from said plurality of elemental images forming the integral image InI, where K is an integer that corresponds to the number of pixels of a pixel cell of the pixel matrix used. Such a generation of sub-images is implemented by a GSI software module as shown in FIG. 2.

An example of such a step C2 in which sub-images are generated from the integral image shown in FIG. 3A is shown in FIG. 4.

In the example shown, the integral image InI includes four elemental images IE1, IE2, IE3 and IE4 comprising respectively five differently colored pixels as mentioned above. The following is performed during the sub-image generation step C2:

grouping, in a first sub-image SI1, of the respective pixels $P1_1$, $P2_1$, $P3_1$, $P4_1$ of each of the elemental images IE1, IE2, IE3, IE4 corresponding to a first viewing angle in perspective, grouping, in a second sub-image SI2, of the respective pixels $P1_2$, $P2_2$, $P3_2$, $P4_2$ of each of the elemental images IE1, IE2, IE3, IE4 corresponding to a second viewing angle in perspective, grouping, in a third sub-image SI3, of the respective pixels $P1_3$, $P2_3$, $P3_3$, $P4_3$ of each of the elemental images IE1, IE2, IE3, IE4 corresponding to a third viewing angle in perspective, grouping, in a fourth sub-image SI4, of the respective pixels $P1_4$, $P2_4$, $P3_4$, $P4_4$ of each of the elemental images IE1, IE2, IE3, IE4 corresponding to a fourth viewing angle in perspective, grouping, in a fifth sub-image SI5, of the respective pixels $P1_5$, $P2_5$, $P3_5$, $P4_5$ of each of the elemental images IE1, IE2, IE3, IE4 corresponding to a fifth viewing angle in perspective.

For the sake of clarity of the figure, only the first two groupings are shown by the arrows.

During a step C3 shown in FIG. 1, according to the invention, the sub-images generated in step C2 are arranged according to a predetermined pattern, such as to form a multi-view image of the object OBJ, the views of the multi-view image comprising respectively the sub-images generated. Such an arrangement of the sub-images in a multi-view image is particularly beneficial because it exploits the spatial and temporal redundancies between the sub-images generated when processing an integral image, as well as between each of the sub-images generated during processing of a current integral image and respectively each of the sub-images generated during processing of one or more other previous integral images.

The form of the pattern is selected to optimize the spatial and temporal correlation between the sub-images generated.

Said arrangement step C3 is implemented by a software module ASI_CO as shown in FIG. 2, which selects a predetermined pattern from a database BD of the encoder CO.

The different forms of patterns are shown in FIGS. 5A to 5D.

In all cases, for a plurality K of sub-images SI1, SI2, . . . , SIK generated during step C2, the sub-image SIr (1≤r≤K) for which the corresponding r-th viewing angle has a zero value, constitutes, according to the invention, the reference view Vr of the multi-view image MVV1 to be formed at time t1 and is placed at the center of said multi-view image.

According to a first preferential example shown in FIG. 5A, the K sub-images SI1, SI2, . . . , SIK are shared successively into K/9 groups G1, G2, . . . , GK/9 of 9 sub-images, the sub-images SI1, SI2, . . . , SIK forming respectively the views V1, V2, . . . , VK of the multi-view image MVV thus formed.

According to a second example shown in FIG. 5B, the K sub-images SI1, SI2, . . . , SIK are arranged successively in a spiral, the view Vr placed at the center of the spiral being the aforementioned sub-image SIr, for which the corresponding r-th viewing angle has a zero value. According to a third example shown in FIG. 5C, the K sub-images SI1, SI2, . . . , SIK are arranged successively from left to right.

According to a fourth example shown in FIG. 5D, the K sub-images SI1, SI2, . . . , SIK are arranged successively from left to right.

During a subsequent step C4 shown in FIG. 1, the multi-view image thus formed in step C3 is adaptively compressed as a function of the motion type of the object OBJ in the scene SC.

Such a step is implemented by a CMP compression software module shown in FIG. 2.

Again with reference to FIG. 1, such an adaptive compression step C4 includes a first sub-step C41, during which the object OBJ shown in FIGS. 3A and 3B, as well as the background of said object, is segmented for each current sub-image $SI1_n$ to $SIK_n$ of a current multi-view image $MVV_n$.

Such a step is implemented by an entirely conventional SGM segmentation software module, which is shown in FIG. 2.

During a sub-step C42 shown in FIG. 1, K motion vectors MV1, MV2, . . . , MVK describing the motion between the K current sub-images $SI1_n$ to $SIK_n$ and respectively the K reference sub-images SIref1, SIref2, . . . , SIrefK are calculated.

Such a step is performed by a first calculation software module CAL1_CO as shown in FIG. 2.

According to a first alternative shown in FIG. 6A, in which the object OBJ only moves in the depth-wise direction in relation to the scanner SCN, the motion vector MVr describing the motion between the r-th current central sub-image $SIr_n$, for which the r-th corresponding viewing angle has a value of zero, and the corresponding reference sub-image SIrref of the reference multi-view image MVVref, has a value of zero. Consequently, as shown in FIG. 6A, the motion vectors associated to the current sub-images other than the r-th current sub-image depend on the viewing angle related to the sub-image in question. In the case shown in FIG. 6A, a given motion vector MVi ($1 \leq i \leq 5$) is calculated using the following trigonometric relationship:

MVi=$\Delta Z \times \tan \theta i$ where $\Delta Z$ represents the depth moved by the object OBJ and $\theta i$ represents the viewing angle of an i-th pixel $pj_i$ of a j-th pixel cell considered CLj ($1 \leq j \leq 4$).

As MVi and $\theta i$ are known values to the encoder CO, the calculation $$\Delta Z = \frac{MVi}{\theta i}$$

is performed during a step C43a.

According to a second alternative shown in FIG. 6B, for which the object OBJ moves only in a vertical plane, it can be noted during a calculation sub-step C43b that the motion vectors $MV1_n, MV2_n, \ldots, MVK_n$ associated respectively to the current sub-images $SI1_n, SI2_n, \ldots, SIK_n$ of the current multi-view image $MVV_n$ are of equal value: $MV1_n = MV2_n = \ldots = MVK_n$.

According to a third alternative (not shown) for which the object OBJ moves in three dimensions in the scene SC or only in two dimensions, all of the current motion vectors $MV1_n, MV2_n, \ldots, MVK_n$ are calculated during a sub-step C43c.

During a sub-step C44 shown in FIG. 1 and that follows the aforementioned sub-steps C43a or C43b, each of the K current sub-images of the current multi-view image $MVV_n$ is predicted as a function respectively of the K reference sub-images SIref1, SIref2, . . . , SIrefK of a reference multi-view image MVVref previously encoded then decoded according to the invention. The aforementioned K sub-images $SIp1_n, SIp2_n, \ldots, SIpK_n$ are therefore obtained. Said prediction is performed in the direction of the arrows shown in FIGS. 5A to 5D, as a function of the arrangement pattern of the sub-images in question.

Such a step is performed by a second prediction software module PRD_CO as shown in FIG. 2.

During a sub-step C45 shown in FIG. 1, a second calculation module CAL2_CO, as shown in FIG. 2, determines the residual data $a1_n, a2_n, \ldots, aK_n$ by comparing the data relating to each current sub-image $SI1_n$ to $SIK_n$, respectively with the data relating to each of the predicted sub-images obtained $SIp1_n, SIp2_n, \ldots, SIpK_n$.

During a sub-step C46a shown in FIG. 1, only the depth value $\Delta Z$ calculated during sub-step C43a and the corresponding residual data determined during the aforementioned sub-step C45 are encoded.

During a sub-step C46b shown in FIG. 1, just one of the motion vectors $MVi_n$ calculated during the calculation sub-step C43b and the corresponding residual data determined during the aforementioned sub-step C45 are encoded.

Such an encoding step C46a or C46b is performed by an entirely conventional encoder, as shown in FIG. 2 and identified by reference sign ENC. Such an encoder operates for example using the H.264/MPEG-AVC standard.

During a step C46c, the different motion vectors calculated during the aforementioned sub-step C43c are encoded.

According to the invention, in the case of the multi-view images shown in FIGS. 5B to 5D, each sub-image is encoded using the MVC standard using an MVC encoder ENC. The encoding structure is therefore as shown in FIG. 7A in which:

certain sub-images of the current multi-view image, as symbolized in FIG. 7A using reference sign I, are encoded by spatial prediction (intra prediction), certain sub-images of the current multi-view image, as symbolized by reference sign P in FIG. 7A, are encoded by temporal prediction (inter prediction) in relation to a reference sub-image already encoded/decoded, using motion compensation, certain sub-images of the current multi-view image, as symbolized by reference sign B in FIG. 7A, are encoded by temporal bi-prediction (inter prediction) in relation to a previous sub-image already encoded/decoded and a subsequent sub-image already encoded/decoded, using motion compensation.

With regard to the multi-view image formed preferentially in FIG. 5A, the present invention proposes an adaptation of the MVC encoding structure for each of the nine groups G1, G2, . . . , GK/9 of nine sub-images.

As shown in FIG. 7B, for each of the groups of sub-images, for example group G1 shown in FIG. 5A, the central sub-image SI5 is encoded as image I, the four sub-images SI2, SI4, SI6, SI8 arranged respectively above, to the left, to the right and below the central sub-image SI5 are encoded as image P, and the four sub-images SI1, SI3, SI7 and SI9 arranged respectively in the four corners of group G1 are encoded as image B. Such an MVC encoding structure optimally eliminates the correlations between adjacent sub-images, which makes it possible to advantageously reduce the complexity of the encoding method.

On completion of the encoding step C46a, C46b or C46c, an encoded video signal SG is generated and sent during a step C5 shown in FIG. 1, using a communication interface IC of the encoding device as shown in FIG. 2, via a communication network, to a remote terminal. This latter has a decoder DO as shown in FIG. 8.

The encoding method described above is repeated for a plurality of integral images belonging to a given sequence.

FIG. 9 describes the decoding method according to the invention implemented in the decoder DO in FIG. 8. Such a decoding method is the inverse of the encoding method described above.

During a first step D1, the current multi-view image MVVn is decompressed using the information contained in the signal SG received. Said decompression is adaptive because it is implemented as a function of the information on the type of motion performed by the object OBJ in the scene SC, as contained in the signal SG received.

Such a step is performed by a decompression module DCMP as shown in FIG. 8.

Again with reference to FIG. 9, such a decompression step includes a sub-step D11 for decoding the residual data contained in the signal SG. Such a step is performed by an entropy decoder DE as shown in FIG. 8.

If the signal SG contains the depth value $\Delta Z$ that the object OBJ has moved exclusively in the scene SC, this value is extracted during a sub-step D12$a$, then, for each current sub-image to be reconstructed, the respective motion vector thereof $MV1_n, MV2_n, \ldots, MVK_n$ is calculated during a sub-step D13$a$, according to the relationship $MVi=\Delta Z \times \tan \theta i$ in which $1 \leq i \leq K$.

If the signal SG contains a single motion vector value MVi as calculated in the aforementioned encoding sub-step C43$b$, this value is extracted during a sub-step D12$b$, then, for each current sub-image to be reconstructed, the respective motion vector thereof $MV1_n, MV2_n, \ldots, MVK_n$ is calculated during a sub-step D13$b$, according to the relationship $MV1_n=MV2_n=\ldots=MVK_n=MVi$.

If the signal SG contains different motion vector values $MV1_n, MV2_n, \ldots, MVi_n, \ldots, MVK_n$ as calculated in the aforementioned encoding sub-step C43$c$, these values are extracted during a sub-step D12$c$.

Each of the steps D13$a$ and D13$b$ is implemented by a first calculation software module CAD_DO as shown in FIG. 8.

The following is performed during a subsequent sub-step D14:
 either the prediction, using the residual data decoded in sub-step D11 and the motion vectors calculated in sub-step D13$a$, of each of the K current sub-images $SI1_n, SI2_n, \ldots, SIK_n$ of said current multi-view image to be reconstructed as a function respectively of K reference sub-images of a reference multi-view image previously decoded, delivering K predicted sub-images $SIp1_n, SIp2_n, SIpK_n$,
 or the prediction, using the residual data decoded in sub-step D11 and the motion vectors calculated in sub-step D13$b$, of each of the K current sub-images SI1n, SI2n, . . . , $SIK_n$ of said current multi-view image to be reconstructed as a function respectively of K reference sub-images of a reference multi-view image previously decoded, delivering K predicted sub-images SIp1n, SIp2n, $SIpK_n$,
 or the prediction, using the residual data decoded in sub-step D11 and the motion vectors calculated in sub-step D13$c$, of each of the K current sub-images $SI1_n, SI2_n, \ldots, SIK_n$ of said current multi-view image to be reconstructed as a function respectively of K reference sub-images of a reference multi-view image previously decoded, delivering K predicted sub-images $SIp1_n, SIp2_n, SIpK_n$.

Said step D14 is performed by a second prediction software module PRD_DO as shown in FIG. 8.

During a sub-step D15, the predicted sub-images obtained in step D14 are decoded using a decoder DEC shown in FIG. 8:
 conventionally, for example using the H.264/MPEG-AVC standard if calculation steps D13$a$ or D13$b$ are performed,
 or using the MVC standard shown in FIG. 7A or the MVC standard according to the structure shown in FIG. 7B, if calculation step D13$c$ is performed.

During a subsequent decoding step D2, the current decoded sub-images SID1, SID2, . . . , SIDK obtained in sub-step D15 are arranged in the order in which the current sub-images were decoded, this order complying with the direction of one of the patterns shown in FIGS. 5A to 5D.

Said arrangement step D2 is performed by a software module ASI_DO as shown in FIG. 8.

During a subsequent decoding step D3, a plurality of elemental images EI is generated on the basis of the arrangement of the decoded sub-images implemented in the previous step D2.

Such a step is implemented by a elemental-image generation module MGEI.

Once all of the decoded elemental images have been generated, the integral image InI is reconstructed during a step D4 on the basis of the elemental images generated in step D3.

Such a step is implemented by an image-reconstruction module MRI as shown in FIG. 8.

The decoding method described above is repeated for a plurality of integral images to be reconstructed belonging to a given sequence.

Naturally, the embodiments described above are provided exclusively for illustrative purposes and are in no way limiting, and numerous modifications could easily be made by the person skilled in the art without thereby moving outside the scope of the invention.

The invention claimed is:

1. A method for encoding at least one current integral image representing at least one object in perspective in a scene and comprising a plurality of elemental images, said method comprising the following acts performed by an encoding device:
 generating a plurality of K sub-images on the basis of said plurality of elemental images;
 arranging said sub-images so as to form a multi-view image of said object, said views corresponding respectively to said sub-images, said arranging being carried out following a pattern selected by the encoding device among a plurality of patterns;
 adaptive compression of said multi-view image formed, as a function of a motion type of the object in the scene, said adaptive compression implementing the following sub-acts for a current multi-view image:
  prediction of each of the K current sub-images of said current multi-view image as a function respectively of K reference sub-images of a reference multi-view image previously encoded then decoded, delivering K predicted sub-images,
  determination of residual data, by comparing data relating to each of the K current sub-images and respectively to each of said K predicted sub-images,
  calculation of K motion vectors describing the motion between said K current sub-images and respectively the K reference sub-images of said reference multi-view image, and calculation of a value of a depth that said object has moved in the scene, if the motion vector calculated in relation to the current sub-image that is located at the center of the current multi-view image has a value of zero, transmission of a data signal comprising at least said residual data determined and said depth value calculated, if the motion vector calculated in relation to the current sub-image that is located at the center of the current multi-view image has a value of zero;

transmission of a data signal comprising at least said residual data determined and said value of one of the K motion vectors calculated, if the K motion vectors calculated have the same value; and transmission of a data signal comprising at least said residual data determined and the respective values of the K motion vectors calculated, if at least two of the K motion vectors calculated have different values.

2. The encoding method as claimed in claim 1, in which MVC encoding is used if at least two of the K motion vectors calculated have different values.

3. A device for encoding at least one current integral image representing at least one object in perspective in a scene and comprising a plurality of elemental images, said device comprising:

means for generating a plurality of K sub-images on the basis of said plurality of elemental images;

means for arranging said sub-images so as to form a multi-view image of said object, said views corresponding respectively to said sub-images, said arranging being carried out following a pattern selected by the device for encoding, among a plurality of patterns; and means for adaptively compressing said multi-view image formed as a function of a motion type of the object in the scene, in which said adaptive compression means include, for a current multi-view image:

sub-means for predicting each of the K current sub-images of said current multi-view image as a function respectively of K reference sub-images of a reference multi-view image previously encoded then decoded, delivering K predicted sub-images, sub-means for determining residual data, by comparing data relating to each of the K current sub-images and respectively to each of said K predicted sub-images, sub-means for calculating K motion vectors describing the motion between said K current sub-images and respectively the K reference sub-images, sub-means for transmitting a data signal comprising at least said residual data determined, said sub-means for transmitting also sending:

either a previously calculated value of s depth that said object has moved in the scene, if the motion vector calculated in relation to the current sub-image that is located at the center of the current multi-view image has a value of zero, or a value of one of the K motion vectors calculated, or the respective values of the K motion vectors calculated, if at least two of the K motion vectors calculated have different values.

4. The device as claimed in claim 3, in which MVC encoding is used if at least two of the K motion vectors calculated have different values.

5. A non-transitory data medium comprising a computer program stored thereon and including instructions to configure a computer of an encoding device to implement a method for encoding at least one current integral image representing at least one object in perspective in a scene and comprising a plurality of elemental images, when the instructions are run on the computer, the method comprising the following acts performed by the encoding device:

generating a plurality of K sub-images on the basis of said plurality of elemental images;

arranging said sub-images so as to form a multi-view image of said object, said views corresponding respectively to said sub-images, said arranging being carried out following a pattern selected by the encoding device among a plurality of patterns;

adaptive compression of said multi-view image formed, by the computer, as a function of a motion type of the object in the scene, said adaptive compression implementing the following sub-acts for a current multi-view image:

prediction of each of the K current sub-images of said current multi-view image as a function respectively of K reference sub-images of a reference multi-view image previously encoded then decoded, delivering K predicted sub-images, determination of residual data, by comparing data relating to each of the K current sub-images and respectively to each of said K predicted sub-images, calculation of K motion vectors describing the motion between said K current sub-images and respectively the K reference sub-images of said reference multi-view image, and calculation of a value of a depth that said object has moved in the scene, if the motion vector calculated in relation to the current sub-image that is located at the center of the current multi-view image has a value of zero, transmission of a data signal comprising at least said residual data determined and said depth value calculated, if the motion vector calculated in relation to the current sub-image that is located at the center of the current multi-view image has a value of zero;

transmission of a data signal comprising at least said residual data determined and said value of one of the K motion vectors calculated, if the K motion vectors calculated have the same value; and transmission of a data signal comprising at least said residual data determined and the respective values of the K motion vectors calculated, if at least two of the K motion vectors calculated have different values.

6. A method for decoding a data signal representing at least one current integral image previously encoded, said integral image representing at least one object in perspective in a scene and comprising a plurality of elemental images, said method comprising the following acts performed by a decoding device:

adaptive decompression of a current multi-view image previously encoded, as a function of the type of motion of the object in the scene, as contained in said data signal, arranging a plurality of K current sub-images of said current multi-view image, so as to reconstruct the multi-view image of said object, said views corresponding respectively to said sub-images, said arranging being carried out following a pattern selected by the decoding device among a plurality of patterns, and generating said plurality of elemental images on the basis of the arrangement of said K sub-images, so as to reconstruct said integral image, wherein the adaptive decompression implements the following sub-acts for a current integral image to be reconstructed:

decoding of residual data relating to said plurality of K sub-images of the multi-view image previously encoded, said residual data being contained in said data signal, if the data signal contains a value of a depth that said object has moved in the scene:
  calculation of a motion vector corresponding to said motion,
  prediction, using said residual data decoded and said motion vector calculated, of each of the K current sub-images of said current multi-view image as a function respectively of K reference sub-images of a reference multi-view image previously decoded, delivering K predicted sub-images, if the data signal contains a single motion vector value calculated during encoding, said vector describing the motion between one of the K sub-images to be reconstructed and one of the K reference sub-images previously decoded, prediction, using said residual data decoded and said motion vector calculated, of each of the K current sub-images of said current multi-view image as a function respectively of K reference sub-images of a reference multi-view image previously decoded, delivering K predicted sub-images, if the data signal contains K motion vector values calculated during encoding, said K motion vectors describing the motion between K sub-images to be reconstructed and respectively K reference sub-images previously decoded, prediction, using said residual data decoded and said K motion vector values, of each of the K current sub-images of said current multi-view image as a function respectively of K reference sub-images of a reference multi-view image previously decoded, delivering K predicted sub-images.

7. The method as claimed in claim 6, in which MVC decoding is used if the data signal contains K motion vector values.

8. A device for decoding a data signal representing at least one current integral image previously encoded, said integral image representing at least one object in perspective in a scene and comprising a plurality of elemental images, said device comprising:
  means for adaptively decompressing a current multi-view image previously encoded, as a function of the type of motion of the object in the scene, as contained in said data signal,
  means for arranging a plurality of K current sub-images of said current multi-view image to reconstruct the multi-view image of said object, said views corresponding respectively to said sub-images, said arranging being carried out following a pattern selected by the device for decoding among a plurality of patterns, and
  means for generating said plurality of elemental images on the basis of the arrangement of said K sub-images, to reconstruct said integral image,
  wherein said adaptive decompression means include:
  sub-means for decoding residual data relating to said plurality of K sub-images previously encoded, said residual data being contained in said data signal,
  sub-means for predicting, using said decoded residual data, each of the K current sub-images of said current multi-view image as a function respectively of K reference sub-images of a reference multi-view image previously decoded, delivering K predicted sub-images, said prediction sub-means also using the following for prediction purposes:
    either the value of a motion vector calculated on the basis of a value of a depth that said object has moved in the scene, if such a value is contained in said data signal,
    or a single motion vector value calculated during encoding, said vector describing the motion between one of the K sub-images to be reconstructed and one of the K reference sub-images previously decoded, if such a value is contained in said data signal,
    or K motion vector values calculated during encoding, said K motion vectors describing the motion between K sub-images to be reconstructed and respectively K reference sub-images previously decoded, if such K values are contained in said data signal.

9. The device as claimed in claim 8, in which MVC decoding is used if the data signal contains K motion vector values.

10. A non-transitory data medium comprising a computer program stored thereon and including instructions to configure a computer of a decoding device to implement a method for decoding a data signal representing at least one current integral image previously encoded, said integral image representing at least one object in perspective in a scene and comprising a plurality of elemental images, when the instructions are run on the computer, wherein the method comprises the following acts performed by the decoding device:
  adaptive decompression of a current multi-view image previously encoded, as a function of the type of motion of the object in the scene, as contained in said data signal,
  arranging a plurality of K current sub-images of said current multi-view image, so as to reconstruct the multi-view image of said object, said views corresponding respectively to said sub-images, said arranging being carried out following a pattern selected by the decoding device among a plurality of patterns,
  generation of said plurality of elemental images on the basis of the arrangement of said K sub-images, so as to reconstruct said integral image,
  wherein the adaptive decompression implements the following sub-acts for a current integral image to be reconstructed:
  decoding of residual data relating to said plurality of K sub-images of the multi-view image previously encoded, said residual data being contained in said data signal,
  if the data signal contains a value of a depth that said object has moved in the scene:
    calculation of a motion vector corresponding to said motion,
    prediction, using said residual data decoded and said motion vector calculated, of each of the K current sub-images of said current multi-view image as a function respectively of K reference sub-images of a reference multi-view image previously decoded, delivering K predicted sub-images,
  if the data signal contains a single motion vector value calculated during encoding, said vector describing the motion between one of the K sub-images to be reconstructed and one of the K reference sub-images previously decoded, prediction, using said residual data decoded and said motion vector calculated, of each of the K current sub-images of said current multi-view image as a function respectively of K reference sub-images of a reference multi-view image previously decoded, delivering K predicted sub-images, if the data signal contains K motion vector values calculated during encoding, said K motion vectors describing the motion between K sub-images to be reconstructed and respectively K reference sub-images previously decoded, prediction, using said residual data decoded and said K motion vector values, of each of the K current sub-images of said current multi-view image as a function respectively of K reference sub-images of a reference multi-view image previously decoded, delivering K predicted sub-images.

11. The non-transitory data medium as claimed in claim 5, in which MVC encoding is used if at least two of the K motion vectors calculated have different values.

12. The non-transitory data medium as claimed in claim 10, in which MVC decoding is used if the data signal contains K motion vector values.

13. The method as claimed in claim 1, wherein the encoding device selects the pattern from the plurality of patterns optimize the spatial and temporal correlation between the sub-images generated.

* * * * *